US009535777B2

(12) United States Patent
Kalavade et al.

(10) Patent No.: US 9,535,777 B2
(45) Date of Patent: Jan. 3, 2017

(54) DEFECT MANAGEMENT POLICIES FOR NAND FLASH MEMORY

(71) Applicant: Intel Corporation, Santa Clara, CA (US)

(72) Inventors: Pranav Kalavade, San Jose, CA (US); Feng Zhu, San Jose, CA (US); Shyam Sunder Raghunathan, Sunnyvale, CA (US); Ravi H. Motwani, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 14/087,282

(22) Filed: Nov. 22, 2013

(65) Prior Publication Data

US 2015/0149818 A1    May 28, 2015

(51) Int. Cl.
| | |
|---|---|
| G06F 11/00 | (2006.01) |
| G11C 29/00 | (2006.01) |
| G06F 11/07 | (2006.01) |
| G11B 20/18 | (2006.01) |

(52) U.S. Cl.
CPC ......... *G06F 11/0751* (2013.01); *G06F 11/073* (2013.01); *G11B 20/1816* (2013.01)

(58) Field of Classification Search
CPC . G06F 11/0727; G06F 11/0751; G06F 11/073; G06F 11/079; G06F 3/067; G11B 20/1816; G11B 20/18
USPC ............ 714/773, 741, 763, 742, 25, 31–33, 35,714/37, 39, 48–49; 703/13–17, 23, 26
See application file for complete search history.

(56) References Cited

U.S. PATENT DOCUMENTS

| | | | | |
|---|---|---|---|---|
| 5,619,644 A | * | 4/1997 | Crockett | G06F 11/0727 714/13 |
| 5,968,182 A | * | 10/1999 | Chen | G06F 11/1435 714/42 |
| 6,931,571 B2 | * | 8/2005 | Bernadat | G06F 11/073 714/25 |
| 8,347,029 B2 | | 1/2013 | Trika et al. | |

(Continued)

FOREIGN PATENT DOCUMENTS

WO    2013089715 A1    6/2013

OTHER PUBLICATIONS

International Search Report for PCT/US20141061486, "Defect Management Policies for NAND Flash Memory", date of mailing Jan. 16, 2015.

*Primary Examiner* — Christine Tu
(74) *Attorney, Agent, or Firm* — Chapin Intellectual Property Law, LLC

(57) ABSTRACT

Systems and methods of managing defects in nonvolatile storage systems that can be used to avoid an inadvertent loss of data, while maintaining as much useful memory in the nonvolatile storage systems as possible. The disclosed systems and methods can monitor a plurality of trigger events for detecting possible defects in one or more nonvolatile memory (NVM) devices included in the nonvolatile storage systems, and apply one or more defect management policies to the respective NVM devices based on the types of trigger events that resulted in detection of the possible defects. Such defect management policies can be used proactively to retire memory in the nonvolatile storage systems with increased granularity, focusing the retirement of memory on regions of nonvolatile memory that are likely to contain a defect.

20 Claims, 5 Drawing Sheets

(56) References Cited

U.S. PATENT DOCUMENTS

| | | | |
|---|---|---|---|
| 8,503,238 B1 * | 8/2013 | Wu | G11C 16/06 365/185.09 |
| 8,549,380 B2 | 10/2013 | Motwani | |
| 8,549,382 B2 | 10/2013 | Motwani | |
| 8,560,922 B2 | 10/2013 | Bivens et al. | |
| 9,135,100 B2 * | 9/2015 | Ware | G06F 11/1008 |
| 2008/0244338 A1 | 10/2008 | Mokhlesi et al. | |
| 2009/0044085 A1 | 2/2009 | Zeng | |
| 2010/0115376 A1 | 5/2010 | Shalvi et al. | |
| 2010/0122148 A1 | 5/2010 | Flynn et al. | |
| 2010/0185906 A1 | 7/2010 | Rauschmayer et al. | |
| 2011/0055468 A1 | 3/2011 | Gonzalez et al. | |
| 2013/0262418 A1 | 10/2013 | Bhasin et al. | |

\* cited by examiner

DEFECT MANAGEMENT POLICIES FOR NAND FLASH MEMORY

TECHNICAL FIELD

Embodiments described herein relate generally to nonvolatile memory technology, and more specifically to systems and methods of managing defects in nonvolatile memory.

BACKGROUND

In a conventional storage system, such as a nonvolatile storage system, data can be stored in accordance with a predetermined error correction coding scheme, such as a low-density parity-check (LDPC) coding scheme. Such a nonvolatile storage system can include a plurality of nonvolatile memory (NVM) devices, each NVM device containing a multitude of NVM storage elements or cells for storing encoded data in the form of LDPC codewords. When reading LDPC codewords from such NVM devices, one or more reference threshold voltage levels can be established between a plurality of programming states of each NVM cell, and a threshold voltage level of the NVM cell can be compared to the respective reference threshold voltage levels to determine the actual programming state of the NVM cell.

In a typical mode of operation, in order to read a desired LDPC codeword from a selected NVM device, a hard bit read operation can be performed, in which the LDPC codeword is read from the selected NVM device as so-called "hard data" (i.e., the logical high and low bit levels in the LDPC codeword are taken as a "1" and "0", respectively). Further, a soft bit read operation can be performed, in which the LDPC codeword is read from the selected NVM device as so-called "soft data" (i.e., the logical high and low bit levels in the LDPC codeword are taken as "1" and "0", respectively, and probability information is provided indicating the likelihood that a respective bit in the LDPC codeword is a "1" or "0"). The LDPC codeword read from the selected NVM device can then undergo error correction decoding to determine whether or not the LDPC codeword is valid. If the decoded LDPC codeword is found to be invalid or "faulty" (e.g., there may have been an error correction coding/decoding failure), then additional LDPC codewords can be read from the other NVM devices, and XOR data recovery can be performed using the additional LDPC codewords in an attempt to recover the desired LDPC codeword.

Such a detection of a faulty LDPC codeword may indicate, among other things, that a physical memory page on the selected NVM device is being affected by an underlying hardware defect (e.g., an open or short circuit), or that the selected NVM device has an intrinsically high residual bit error rate (RBER). In any case, it would be desirable to have a mechanism for managing defects in nonvolatile storage systems that can be used to avoid an inadvertent loss of data, while maintaining as much useful memory in the nonvolatile storage systems as possible.

BRIEF DESCRIPTION OF THE DRAWINGS

The accompanying drawings, which are incorporated in and constitute part of this specification, illustrate one or more embodiments described herein, and, together with the Detailed Description, explain these embodiments. In the drawings:

FIG. 1b is a block diagram of exemplary NVM read logic included in the nonvolatile storage system of FIG. 1a;

FIG. 2 is a diagram of "voltage" versus "probability" that represents the decoding of a codeword read from an NVM device included in the nonvolatile storage system of FIG. 1a;

FIG. 3 is a flow diagram illustrating an exemplary method of operating the NVM defect management policy engine included in the nonvolatile storage system of FIG. 1a.

DESCRIPTION OF EMBODIMENTS

Systems and methods of managing defects in nonvolatile storage systems are disclosed that can be used to avoid an inadvertent loss of data, while maintaining as much useful memory in the nonvolatile storage systems as possible. The disclosed systems and methods can monitor a plurality of trigger events for detecting possible defects in one or more nonvolatile memory (NVM) devices included in the nonvolatile storage systems, and apply one or more defect management policies to the respective NVM devices based on the types of trigger events that resulted in detection of the possible defects. Such defect management policies can be used proactively to retire memory in the nonvolatile storage systems with increased granularity, focusing the retirement of memory on regions of nonvolatile memory that are likely to contain a defect.

Figure 1A:
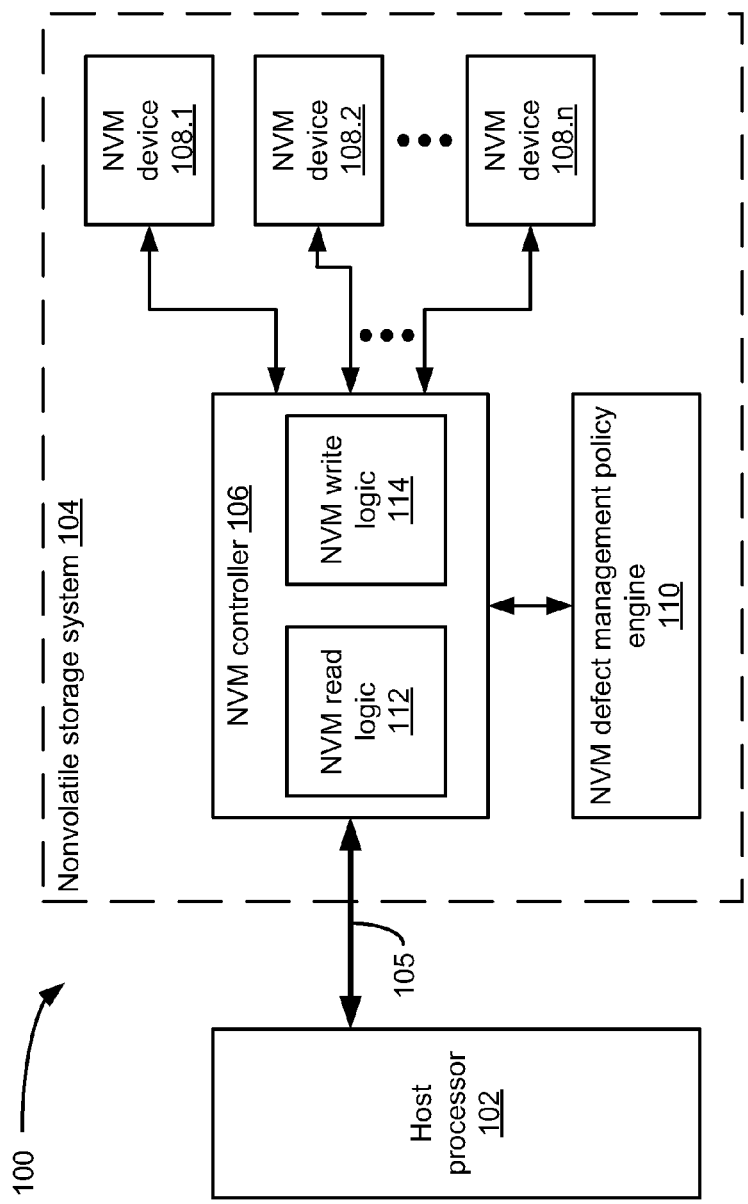
FIG. 1a is a block diagram of an exemplary nonvolatile storage system including a nonvolatile memory (NVM) defect management policy engine, in accordance with the present application.

FIG. 1a depicts an illustrative embodiment of an exemplary system 100 for accessing one or more NVM devices in a nonvolatile storage system, in accordance with the present application. As shown in FIG. 1a, the system 100 includes a host processor 102, a nonvolatile storage system 104, and a memory bus 105 operative to communicably couple the host processor 102 to the nonvolatile storage system 104. The nonvolatile storage system 104 includes an NVM controller 106, one or more NVM devices 108.1-108.n communicably coupled to the NVM controller 106, and an NVM defect management policy engine 110 communicably coupled to the NVM controller 106. As further shown in FIG. 1a, the NVM controller 106 includes NVM read logic 112 for use in reading data from the respective NVM devices 108.1-108. n, as well as NVM write logic 114 for use in writing data to the respective NVM devices 108.1-108.n, in response to one or more data read/write requests issued by the hostprocessor 102.

In the system 100 of FIG. 1a, the host processor 102 can be implemented using one or more processors, one or more multi-core processors, and/or any other suitable processor or processors. Further, each of the NVM devices 108.1-108.n can include nonvolatile memory such as NAND or NOR flash memory that uses a single bit per memory cell, multi-level cell (MLC) memory such as NAND flash memory with two bits per cell, polymer memory, phase-change memory (PCM), nanowire-based charge-trapping memory, ferroelectric transistor random access memory (FeTRAM), 3-dimensional cross-point memory, nonvolatile memory that uses memory resistor (memristor) technology, or any other suitable nonvolatile memory. In addition, the nonvolatile storage system 104 can be configured as a solid-state drive (SSD) or any other suitable persistent data storage medium, and the memory bus 105 may be implemented as a Peripheral Component Interconnect express (PCIe) bus, or any other suitable interface to the persistent data storage medium.

Figure 1B:
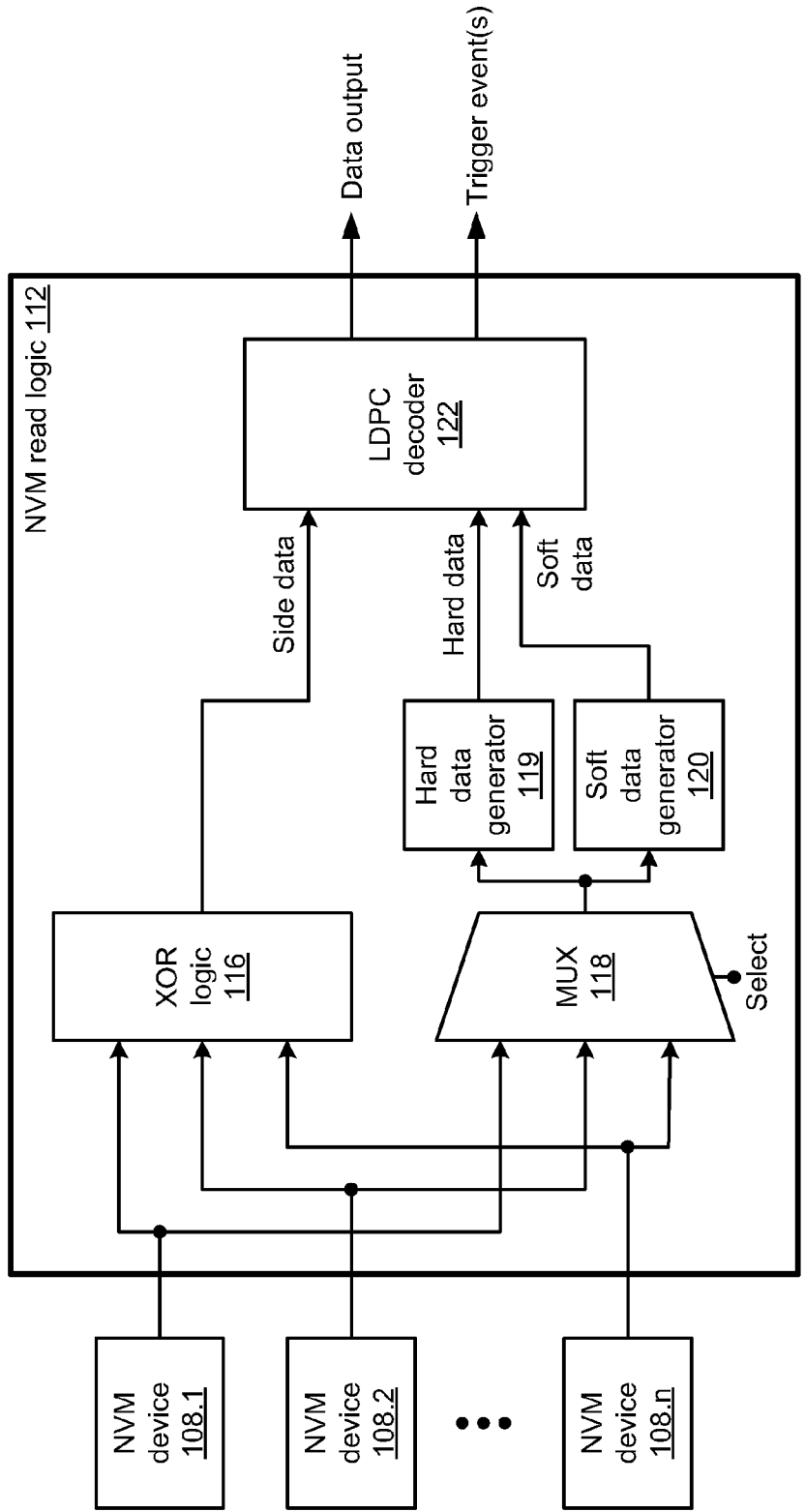

FIG. 1b depicts an exemplary functional view of the NVM read logic 112 included in the NVM controller 106. As shown in FIG. 1b, the NVM read logic 112 includes exclusive- or (XOR) logic 116, a multiplexer (MUX) 118, a hard data generator 119, a soft data generator 120, and an error correction decoder such as a low-density parity-check (LDPC) decoder 122, or any other suitable error correction decoder. In one embodiment, LDPC coding is employed to store data in at least some of the respective NVM devices 108.1-108.n in the form of LDPC encoded data (also referred to herein as "LDPC codewords"). For example, at least some of the NVM devices 108.1-108.n–1 may be used to store such LDPC codewords, and at least the NVM device 108.n may be used to store redundant data (also referred to herein as "XOR data"), which may subsequently be employed to recover any decoded LDPC codewords found to be invalid or "faulty" due to, e.g., one or more error correction coding/decoding failures, etc. Further, such XOR data stored in the NVM device 108.n can be generated by performing exclusive- or (XOR) operations on the LDPC codewords stored in corresponding NVM storage locations of at least some of the respective NVM devices 108.1-108.n–1.

It is noted that nonvolatile memory storage can be organized within each of the NVM devices 108.1-108.n in a plurality of blocks of nonvolatile memory. Further, each block can include sixty-four (64) sequentially ordered pages, or any other suitable number of sequentially ordered pages. In addition, each page can include a plurality of NVM storage elements or cells for storing the LDPC encoded data or XOR data, as well as any metadata (e.g., valid/invalid markers, physical/logical addresses, a sequence number) that may have been generated for the page, or the data stored on the page.

In the system 100 of FIG. 1a, the NVM defect management policy engine 110 is operative to monitor a plurality of trigger events for detecting possible defects in one or more of the NVM devices 108.1-108.n included in the nonvolatile storage system 104, and to apply one or more defect management policies to the respective NVM devices 108.1-108.n based on the types of trigger events that resulted in detection of the possible defects. In one embodiment, such trigger events can include at least three (3) types of trigger events, namely, a hard bit read (HBR) trigger event, a soft bit read (SBR) trigger event, and an XOR data recovery trigger event. Further, each of the HBR trigger event, SBR trigger event, and XOR data recovery trigger event can be generated, from time to time, during the operation of reading data from the respective NVM devices 108.1-108.n using the NVM read logic 112.

Figure 2:
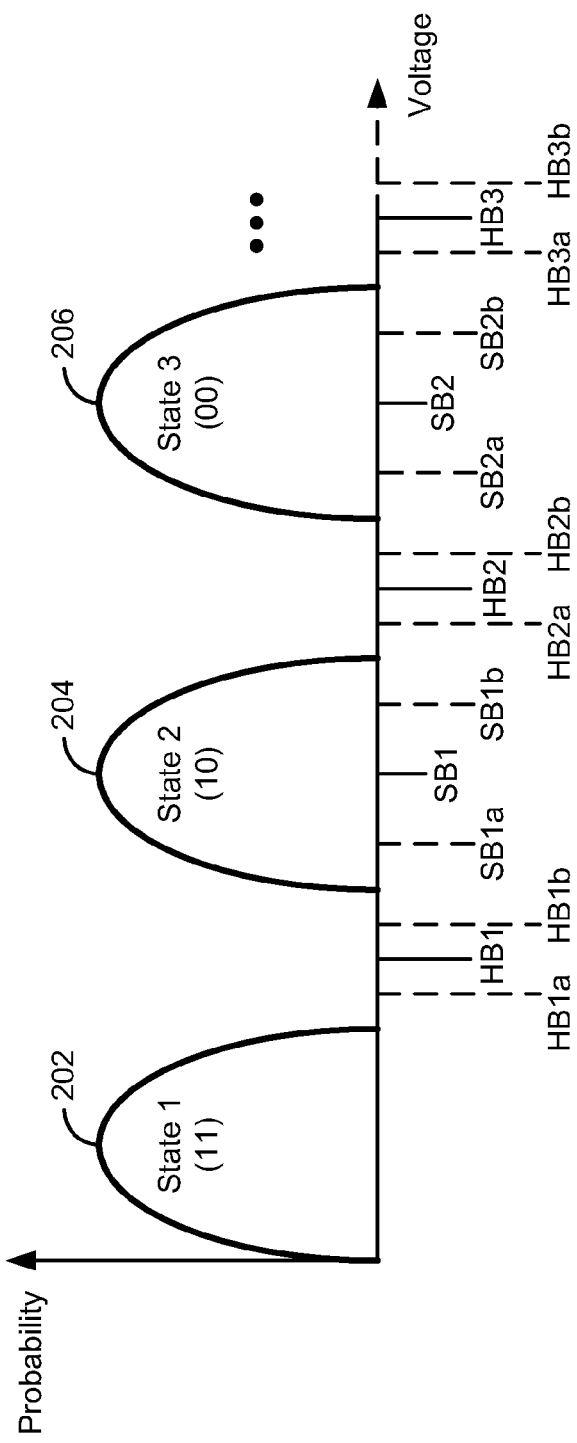

The generation of HBR trigger events, SBR trigger events, and XOR data recovery trigger events will be further understood with reference to the following illustrative example, and FIGS. 1a-1b and 2. In this example, the NVM read logic 112 within the NVM controller 106 is employed to read data from one or more of the respective NVM devices 108.1-108. n in response to a data read request issued over the memory bus 105 by the host processor 102. For example, the host processor 102 may issue a data read request for reading a desired LDPC codeword stored at a specified NVM storage location within the NVM device 108.1. Further, the specified NVM storage location can include one or more NVM cells, each of which can be decoded to correspond to a 2-bit value, a 3-bit value, or any other suitable multi-bit value.

FIG. 2 depicts is a diagram of "voltage" versus "probability" that represents the decoding of the desired LDPC codeword stored at the specified NVM storage location within the NVM device 108.1. As illustrated in FIG. 2, an exemplary NVM cell included in the specified NVM storage location can, for example, be an MLC NAND cell with two bits per cell, which can be decoded to a 2-bit value represented by one of a plurality of states (e.g., at least state 1 (11), state 2 (10), state 3 (00)). Specifically, the states 1, 2, 3 are illustrated with reference to three (3) curves 202, 204, 206, respectively, which represent the mathematical probabilities that the voltage along the horizontal axis corresponds to the various bit combinations (e.g., 11, 10, 00) that give rise to the respective states 1, 2, 3. Using the mathematical probabilities represented by the curves 202, 204, 206 of FIG. 2, what is referred to herein as a "hard bit read" or a "soft bit read" from the NVM cell can be decoded to correspond to a 2-bit value represented by one of the states 1, 2, 3.

When the NVM read logic 112 (see FIG. 1b) is to be used to perform a hard bit read from the exemplary NVM cell, at least one hard bit (HB) reference threshold voltage level can be established between adjacent ones of the states 1, 2, 3, . . . (see FIG. 2). For example, at least a first HB reference threshold voltage level (HB1) can be established between the adjacent states 1, 2, at least a second HB reference threshold voltage level (HB2) can be established between the adjacent states 2, 3, and at least a third HB reference threshold voltage level (HB3) can be established between the state 3 and a next adjacent state (not shown). Further, a threshold voltage level of the NVM cell can be compared to at least these reference threshold voltage levels HB1, HB2, HB3 to determine the actual state 1, 2, 3, . . . , of the NVM cell.

With reference to FIG. 2, if, when performing a hard bit read, it is determined that the reference threshold voltage level HB1 is greater than the threshold voltage level of the exemplary NVM cell, then it can be concluded that the NVM cell is in the state 1. Further, if it is determined that the threshold voltage level of the NVM cell is greater than the reference threshold voltage level HB1 but less than the reference threshold voltage level HB2, then it can be concluded that the NVM cell is in the state 2. Moreover, if it is determined that the threshold voltage level of the NVM cell is greater than the reference threshold voltage level HB2 but less than the reference threshold voltage level HB3, then it can be concluded that the NVM cell is in the state 3.

When the NVM read logic 112 (see FIG. 1b) is to be used to perform a soft bit read from the exemplary NVM cell, at least one soft bit (SB) reference threshold voltage level can be established, e.g., along the horizontal axis within the regions of the curves 202, 204, 206 corresponding to the respective states 1, 2, 3, respectively, or at any other suitable location along the horizontal axis. For example, at least a first SB reference threshold voltage level (SB1) can be established within the region of the curve 204 corresponding to the state 2, and at least a second SB reference threshold voltage level (SB2) can be established within the region of the curve 206 corresponding to the state 3.

With reference to FIG. 2, if, when performing a soft bit read, it is determined that the threshold voltage level of the exemplary NVM cell is greater than the reference threshold voltage level HB1 but less than the reference threshold voltage level SB1, then it can be concluded that the threshold voltage level of the NVM cell is in the upper voltage region of the curve 202 corresponding to the state 1. Similarly, if it is determined that the threshold voltage level of the NVM cell is greater than the reference threshold voltage level HB2 but less than the reference threshold voltage level SB2, then it can be concluded that the threshold voltage level of the NVM cell is in the upper voltage region of the curve 204 corresponding to the state 2. In this way, such a soft bit read can allow the state of the NVM cell to be determined with increased resolution.

In response to the data read request issued by the host processor 102, the NVM read logic 112 (see FIGS. 1a, 1b) operates to control the MUX 118 to read the desired LDPC codeword from a selected one of the NVM devices 108.1-108.n-1. As discussed above, at least some of the NVM devices 108.1-108.n-1 may be used to store such LDPC codewords, and at least the NVM device 108.n may be used to store redundant data (XOR data).

In this example, the NVM read logic 112 controls the MUX 118 to first perform a hard bit read of the desired LDPC codeword from the selected NVM device. To that end, the MUX 118 receives data corresponding to the LDPC codeword from at least one NVM storage location of the selected NVM device, and provides the received data to the hard data generator 119, which uses the data to compare a threshold voltage level of at least one NVM cell included in the NVM storage location to one or more hard bit (HB) reference threshold voltage levels (e.g., HB1, HB2, HB3; see FIG. 2) (also referred to herein as the "center reference threshold voltage levels") to determine the state (e.g., state 1, 2, 3, . . . ; see FIG. 2) of the NVM cell. In one embodiment, the hard data generator 119 can further operate to compare the threshold voltage level of the NVM cell to one or more additional HB reference threshold voltage levels (e.g., HB1a, HB1b, HB2a, HB2b, HB3a, HB3b; see FIG. 2) offset from the respective center reference threshold voltage levels (e.g., HB1, HB2, HB3; see FIG. 2) to determine the state of the NVM cell. The hard data generator 119 then provides so-called "hard data" generated from the respective hard bit threshold voltage level comparisons to the LDPC decoder 122.

The NVM read logic 112 can further control the MUX 118 to perform a soft bit read of the LDPC codeword from the selected NVM device. To that end, the MUX 118 provides the data corresponding to the LDPC codeword to the soft data generator 120, which uses the data to compare the threshold voltage level of the NVM cell to one or more soft bit (SB) reference threshold voltage levels (e.g., SB1, SB2; see FIG. 2) to determine the state (e.g., state 1, 2, 3, . . . ; see FIG. 2) of the NVM cell. In one embodiment, the soft data generator 120 can further operate to compare the threshold voltage level of the NVM cell to one or more additional SB reference threshold voltage levels (e.g., SB1a, SB1b, SB2a, SB2b; see FIG. 2) offset from the respective SB1, SB2 reference threshold voltage levels to determine the state of the NVM cell. The soft data generator 120 then provides so-called "soft data" generated from the respective soft bit threshold voltage level comparisons to the LDPC decoder 122.

Having received the hard data and the soft data from the hard data generator 119 and the soft data generator 120, respectively, the LDPC decoder 122 operates to first decode the LDPC codeword, using the hard data, to determine whether or not the LDPC codeword is valid. If the LDPC codeword is determined to be valid, then the LDPC decoder 122 can forward the decoded LDPC codeword to the host processor 102 as data output (see FIG. 1b). If, having been decoded using the hard data, the LDPC codeword is found to be invalid or "faulty" (e.g., there may have been an error correction coding/decoding failure), then the LDPC decoder 122 can generate a trigger event(s) (see FIG. 1b), namely, an HBR trigger event, for receipt at the NVM defect management policy engine 110. It is noted that such a detection of a faulty LDPC codeword may indicate, among other things, that a physical memory page on the selected NVM device is being affected by an underlying hardware defect (e.g., an open or short circuit), or that the selected NVM device has an intrinsically high residual bit error rate (RBER).

Following one or more unsuccessful attempts to decode the LDPC codeword using the hard data, the LDPC decoder 122 can further operate to decode the LDPC codeword using the soft data generated by the soft data generator 120. In one embodiment, the LDPC decoder 122 can implement an iterative probabilistic decoding process to decode the LDPC codeword by assigning initial probability metrics to each bit in the LDPC codeword. For example, such an iterative probabilistic decoding process can employ probability metrics in the form of logarithmic likelihood ratios (LLRs), in which a plurality of LLR values are provided as measures of the reliability that the bit values read from the selected NVM device are known. If the LDPC codeword is determined to be valid, then the LDPC decoder 122 can forward the decoded LDPC codeword to the host processor 102 as data output (see FIG. 1b). If, having been decoded using the soft data, the decoded LDPC codeword is again found to be faulty, then the LDPC decoder 122 can generate a further trigger event(s) (see FIG. 1b), namely, an SBR trigger event, for receipt at the NVM defect management policy engine 110.

Following one or more unsuccessful attempts to decode the LDPC codeword using the soft data, the LDPC decoder 122 can still further operate to perform XOR data recovery in an attempt to recover the desired LDPC codeword. To that end, the NVM read logic 112 (see FIGS. 1a, 1b) controls the XOR logic 116 to receive additional LDPC codewords stored in the currently unselected NVM devices 108.1-108.n-1, as well as XOR data stored in the NVM device 108.n. The XOR logic 116 operates to perform one or more exclusive- or (XOR) operations on these additional LDPC codewords and XOR data, and to provide the results of the XOR operations as so-called "side data" to the LDPC decoder 122, which can perform additional LDPC decoding using at least these side data to recover the desired LDPC codeword.

Such additional LDPC decoding performed by the LDPC decoder 122 can involve any suitable XOR data recovery process. In one embodiment, the XOR data recovery process can include combining at least the additional LDPC codewords in the side data with the soft data, and performing LDPC decoding on the combined data. If at least some of the additional LDPC codewords fail to decode successfully, then one or more XOR operations can be performed on the successfully decoded and unsuccessfully decoded LDPC codewords, and the results of these XOR operations can undergo further LDPC decoding. If such further LDPC decoding is unsuccessful, then one or more additional XOR operations can be performed on the LDPC codewords, and the results of the additional XOR operations can be combined for still further LDPC decoding. If such further LDPC decoding is deemed to be successful, then it can be concluded that the desired LDPC codeword is recoverable. The LDPC decoder 122 can then provide the recovered LDPC codeword as data output for subsequent forwarding to the host processor 102. Otherwise, if such further LDPC decoding is again unsuccessful, then the LDPC decoder 122 can generate an additional trigger event(s), namely, an XOR data recovery trigger event, for receipt at the NVM defect management policy engine 110.

As discussed above, the NVM defect management policy engine 110 is operative to monitor a plurality of trigger events for detecting possible defects in one or more of the NVM devices 108.1-108.n, and to apply one or more defect management policies to the respective NVM devices 108.1-108.n based on the types of trigger events that resulted in detection of the possible defects. In this example, the types of trigger events monitored by the NVM defect management policy engine 110 can include an HBR trigger event, an SBR trigger event, and an XOR data recovery trigger event. Such defect management policies can be used proactively to retire memory in the nonvolatile storage system 104 with increased granularity, focusing the retirement of memory on regions of nonvolatile memory that are likely to contain a defect.

Such retirement of memory in the nonvolatile storage system 104 (see FIG. 1a) can involve the retirement (i.e., the discontinued use) of at least one block of nonvolatile memory, at least one page within at least one block of nonvolatile memory, at least one NVM storage location within at least one page, or any other suitable region of nonvolatile memory. For example, a physical memory block/page can be retired by relocating its data content to another physical memory block/page or other region of nonvolatile memory, and placing the retired physical memory block/page on one or more lists of blocks/pages that should not be subsequently allocated for storing data. A region of nonvolatile memory can also be retired by remapping an address for that region of nonvolatile memory to correspond to the address for another region of nonvolatile memory. Such lists of retired blocks/pages and/or remapped addresses can be stored in volatile or nonvolatile memory associated with the NVM controller 106 (e.g., a memory 420b; see FIG. 4).

In one embodiment, in order to retire a region of nonvolatile memory in the nonvolatile storage system 104, the NVM defect management policy engine 110 can apply at least the following policies to the respective NVM devices 108.1-108.n:

Policy 1—In response to an SBR trigger event and/or an XOR data recovery trigger event, (a) retire the NVM storage location of a codeword for which the host processor 102 issued a data read request, or (b) retire the physical memory page that includes the NVM storage location of the codeword for which the host processor 102 issued the data read request; and Policy 2—In response to a predetermined number of HBR trigger events, (a) retire the NVM storage location of a codeword for which the host processor 102 issued one or more data read requests, or (b) retire the physical memory page that includes the NVM storage location of the codeword for which the host processor 102 issued the data read requests.

It is noted that repeated application of Policy 1(a) above, in response to an XOR data recovery trigger event, may lead to an increased number of pages associated with SBR trigger events as the nonvolatile memory undergoes multiple program/erase (P/E) cycles. The application of Policy 1(a), in response to an SBR trigger event, may be more advantageous in maintaining a suitable bound on the SBR trigger event rate because each instantaneous SBR trigger event would be associated with a new page; any pages that may have been associated with prior SBR trigger events would have already been retired.

The application of Policy 1(b) above, in response to an SBR trigger event, may be considered to be more proactive than the application of Policy 1(a) because the intrinsic residual bit error rate (RBER) is generally uniform across a page. For example, if a codeword at one NVM storage location on a page causes an SBR trigger event, it is likely that another codeword at another NVM storage location on that page would cause another SBR trigger event. The application of Policy 1(b) may also reduce the memory requirements for storing lists of retired blocks/pages and/or remapped addresses.

The application of Policy 2(a) above, in response to a predetermined number of HBR trigger events, may be considered to be more proactive than the application of Policy 1(a), in response to an SBR trigger event. Further, the application of Policy 2(b) above, in response to a predetermined number of HBR trigger events, may be considered to be more proactive than the application of Policy 1(b), in response to an SBR trigger event. In general, as the respective policies for retiring regions of nonvolatile memory become more proactive, more regions of the nonvolatile memory can be retired for the same P/E cycle count. Such proactive policies for retiring regions of nonvolatile memory can therefore lead to reduced over-provisioning, increased write amplification, and/or higher endurance.

Figure 3:
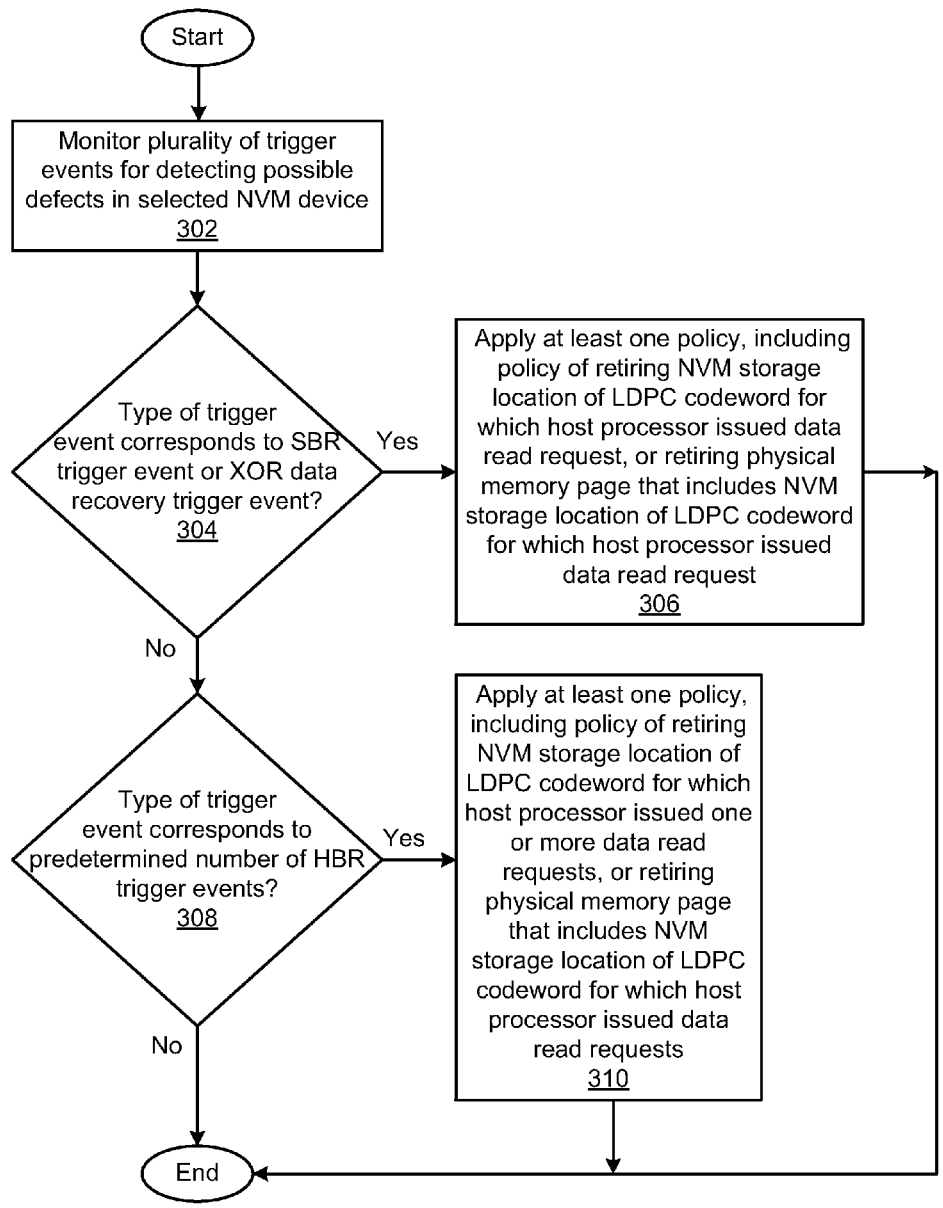

An exemplary method of operating the NVM defect management policy engine 110 included in the nonvolatile storage system 104 is described below with reference to FIGS. 1a, 1b, and 3. As depicted in block 302 (see FIG. 3), the NVM defect management policy engine 110 (see FIG. 1a) monitors a plurality of trigger events for detecting possible defects in a selected one of the NVM devices 108.1-108.n (see FIGS. 1a, 1b). Such trigger events can include at least one HBR trigger event, at least one SBR trigger event, and/or at least one XOR data recovery trigger event. Further, such trigger events can be generated by the LDPC decoder 122 during one or more attempts to decode an LDPC codeword read from the selected NVM device. As depicted in block 304, a determination is made as to whether or not the type of trigger event corresponds to an SBR trigger event or an XOR data recovery trigger event. In the event the type of trigger event corresponds to the SBR trigger event or the XOR data recovery trigger event, at least one policy is applied, by the NVM defect management policy engine 110, including the policy of retiring the NVM storage location of the LDPC codeword for which the host processor 102 issued a data read request, or retiring the physical memory page that includes the NVM storage location of the LDPC codeword for which the host processor 102 issued the data read request, as depicted in block 306. As depicted in block 308, a further determination is made as to whether or not the type of trigger event corresponds to a predetermined number of HBR trigger events. In the event the type of trigger event corresponds to the predetermined number of HBR trigger events, at least one further policy is applied, by the NVM defect management policy engine 110, including the policy of retiring the NVM storage location of the LDPC codeword for which the host processor 102 issued one or more data read requests, or retiring the physical memory page that includes the NVM storage location of the LDPC codeword for which the host processor 102 issued the data read requests, as depicted in block 310.

Figure 4:
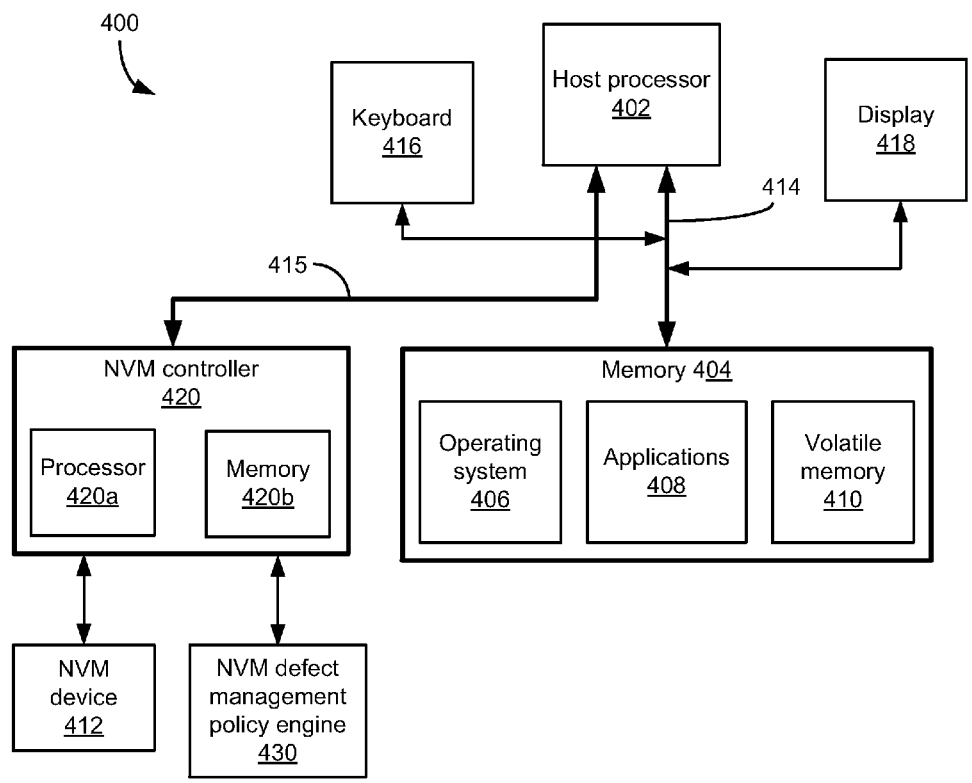
FIG. 4 is a block diagram of an exemplary computer system in which the nonvolatile storage system of FIG. 1a may be employed.

FIG. 4 depicts an exemplary computer system 400 that can be configured to implement systems and methods of the claimed invention. As shown in FIG. 4, the computer system 400 can include at least one processor 402 communicably coupled to at least one memory 404 by a system bus 414, and communicably coupled to an NVM controller 420 by a memory bus 415. The computer system 400 can further include a keyboard 416 and a display 418 communicably coupled to the system bus 414, and an NVM defect management policy engine 430 and an NVM device 412 communicably coupled to the NVM controller 420. The NVM controller 420 includes at least one processor 420a operative to execute at least one program out of at least one non-transitory storage medium, such as the memory 420b or any other suitable storage medium, to access persistent data storable in one or more blocks/pages within the NVM device 412, and to control operations of the NVM defect management policy engine 430. The processor 402 is operative to execute instructions stored on at least one non-transitory storage medium, such as the memory 404 or any other suitable storage medium, for performing various processes within the computer system 400, including one or more processes for controlling operations of the NVM controller 420. The memory 404 can include one or more memory components such as a volatile memory 410, which may be implemented as dynamic random access memory (DRAM) or any other suitable volatile memory. The memory 404 can also be configured to store an operating system 406 executable by the processor 402, as well as one or more applications 408 that may be run by the operating system 406. In response to a request generated by one of the applications 408, the processor 402 can execute the operating system 406 to perform desired data write/read operations on the volatile memory 410, and/or desired block/page write/read operations on the NVM device 412 via the NVM controller 420.

It is noted that FIG. 4 illustrates an exemplary embodiment of the computer system 400, and that other embodiments of the computer system 400 may include more components, or fewer components, than the components illustrated in FIG. 4. Further, the components may be arranged differently than as illustrated in FIG. 4. For example, in some embodiments, the NVM device 412 may be located at a remote site accessible to the computer system 400 via the Internet or any other suitable network. In addition, functions performed by various components contained in other embodiments of the computer system 400 may be distributed among the respective components differently than as described herein.

Having described the above exemplary embodiments of the disclosed systems and methods, other alternative embodiments or variations may be made. For example, it was described herein that a physical memory page with a defect(s) could be retired by relocating its data content to another physical memory page or other region of nonvolatile memory. Such data relocation generally means that the data on the defective physical memory page will be relocated to the other physical memory page as soon as possible to avoid further trigger events, such as SBR trigger events, occurring as a result of reading data from the defective page. After the data relocation is accomplished, the defective page (e.g., an upper page, a lower page) is to be retired permanently. In order to maintain a desired cell-to-cell coupling between neighboring word lines of the nonvolatile memory, as well as to maintain desired read-write buffer (RWB) margins on the neighboring word lines, a suitable random pattern of data can be programmed onto the retired page (upper or lower) each time a block/band containing the retired page is to be programmed. Further, if the retired page corresponds to a lower page, then the associated upper page can be made more robust by modifying a pre-read voltage of the lower page during programming of the upper page. In this way, the modified pre-read voltage of the lower page can be used to effectively push potential errors from the upper page into the lower page, which is to be retired and never read again.

In addition, it was described herein that the application of Policy 1(b) above may reduce the memory requirements for storing lists of retired blocks/pages and/or remapped addresses. To further reduce such memory requirements, the granularity of memory retirement may be modified from a single page to a group of pages. For example, if such a group of pages includes N single-plane pages (e.g., for a dual plane page, N=2; for a quad plane page, N=4), then the memory requirements may be reduced by a factor of N. Moreover, the amount of stored information relating to the lists of retired blocks/pages and/or remapped addresses can be reduced to a simple bit map for all of the retired pages (or groups of pages), indicating whether or not those pages or groups of pages contain a defect(s).

Further modifications of the granularity of memory retirement are also possible. For example, in a random array of independent disks (RAID) scheme with bands configured as blocks across multiple NVM devices (e.g., dice), the same page can be retired for all blocks in the same stripe or die. Alternatively, the same page can be retired for all blocks if one or more HBR trigger events occur in more than a predetermined number of blocks for the same page in the same die.

The following examples pertain to further illustrative embodiments of the disclosed systems and methods. Example 1 is a method of managing defects in a nonvolatile storage system, in which the nonvolatile storage system includes one or more nonvolatile memory (NVM) devices. The method includes monitoring, by an NVM defect management policy engine, a plurality of trigger events for detecting possible defects in at least one NVM device, in which each of the plurality of trigger events has an associated type. The method further includes, having monitored at least one trigger event, determining the type of the trigger event by the NVM defect management policy engine, and applying, by the NVM defect management policy engine, at least one defect management policy to the NVM device based on the type of the trigger event.

In Example 2, the subject matter of Example 1 can optionally include features wherein the type of the trigger event includes one or more of a soft bit read trigger event and an exclusive- or (XOR) data recovery trigger event, and wherein the applying of the at least one defect management policy to the NVM device includes retiring an NVM storage location of a codeword for which a host processor issued a data read request.

In Example 3, the subject matter of any one of Examples 1-2 can optionally include features wherein the type of the trigger event includes one or more of the soft bit read trigger event and the XOR data recovery trigger event, and wherein the applying of the at least one defect management policy to the NVM device includes retiring a physical memory page that includes the NVM storage location of the codeword for which the host processor issued the data read request.

In Example 4, the subject matter of Example 1 can optionally include features wherein the type of the trigger event includes a predetermined number of hard bit read trigger events, and wherein the applying of the at least one defect management policy to the NVM device includes retiring an NVM storage location of a codeword for which a host processor issued one or more data read requests.

In Example 5, the subject matter of any one of Examples 1 and 4 can optionally include features wherein the type of the trigger event includes the predetermined number of hard bit read trigger events, and wherein the applying of the at least one defect management policy to the NVM device includes retiring a physical memory page that includes the NVM storage location of the codeword for which the host processor issued the data read requests.

In Example 6, the subject matter of any one of Examples 3 and 5 can optionally include, in the event a region of nonvolatile memory containing the physical memory page is to be programmed, programming a predetermined random pattern of data onto the physical memory page.

In Example 7, the subject matter of any one of Examples 3 and 5 can optionally include features wherein the retiring of the physical memory page includes retiring a group of pages.

In Example 8, the subject matter of any one of Examples 3 and 5 can optionally include features wherein the retiring of the physical memory page includes retiring a same page in a plurality of blocks in one or more of the NVM devices.

Example 9 is a nonvolatile storage system that includes a nonvolatile memory (NVM) controller, one or more NVM devices communicably coupled to the NVM controller, and an NVM defect management policy engine communicably coupled to the NVM controller. The NVM defect management policy engine is operative to monitor a plurality of trigger events for detecting possible defects in at least one NVM device, in which each of the plurality of trigger events has an associated type. The NVM defect management policy engine is further operative, having monitored at least one trigger event, to determine the type of the trigger event, and to apply at least one defect management policy to the NVM device based on the type of the trigger event.

In Example 10, the subject matter of Example 9 can optionally include features wherein the type of the trigger event includes one or more of a soft bit read trigger event and an exclusive- or (XOR) data recovery trigger event, and wherein the NVM defect management policy engine is further operative, having monitored the soft bit read trigger event or the XOR data recovery trigger event, to retire an NVM storage location of a codeword for which a host processor issued a data read request.

In Example 11, the subject matter of any one of Examples 9-10 can optionally include features wherein the type of the trigger event includes one or more of the soft bit read trigger event and the XOR data recovery trigger event, and wherein the NVM defect management policy engine is further operative, having monitored the soft bit read trigger event or the XOR data recovery trigger event, to retire a physical memory page that includes the NVM storage location of the codeword for which the host processor issued the data read request.

In Example 12, the subject matter of Example 9 can optionally include features wherein the type of the trigger event includes a predetermined number of hard bit read trigger events, and wherein the NVM defect management policy engine is further operative, having monitored the predetermined number of hard bit read trigger events, to retire an NVM storage location of a codeword for which a host processor issued one or more data read requests.

In Example 13, the subject matter of any one of Examples 9 and 12 can optionally include features wherein the type of the trigger event includes the predetermined number of hard bit read trigger events, and wherein the NVM defect management policy engine is further operative, having monitored the predetermined number of hard bit read trigger events, to retire a physical memory page that includes the NVM storage location of the codeword for which the host processor issued the data read requests.

In Example 14, the subject matter of any one of Examples 11 and 13 can optionally include features wherein the NVM controller is operative, in the event a region of nonvolatile memory containing the physical memory page is to be programmed, to control programming of a predetermined random pattern of data onto the physical memory page.

Example 15 is a computer system that includes a system bus, a memory bus, a display communicably coupled to the system bus, at least one volatile memory coupled to the system bus, and the nonvolatile storage system of Example 9 communicably coupled to the memory bus.

Example 16 is a nonvolatile storage system including one or more nonvolatile memory (NVM) devices, in which the system includes means for monitoring a plurality of trigger events for detecting possible defects in at least one NVM device, in which each of the plurality of trigger events has an associated type. The system further includes, having monitored at least one trigger event, means for determining the type of the trigger event, and means for applying at least one defect management policy to the NVM device based on the type of the trigger event.

In Example 17, the subject matter of Example 16 can optionally include features wherein the type of the trigger event includes one or more of a soft bit read trigger event and an exclusive- or (XOR) data recovery trigger event, and wherein the system further includes, having monitored the soft bit read trigger event or the XOR data recovery trigger event, means for retiring an NVM storage location of a codeword for which a host processor issued a data read request.

In Example 18, the subject matter of any one of Examples 16 and 17 can optionally include features wherein the type of the trigger event includes one or more of the soft bit read trigger event and the XOR data recovery trigger event, and wherein the system further includes, having monitored the soft bit read trigger event or the XOR data recovery trigger event, means for retiring a physical memory page that includes the NVM storage location of the codeword for which the host processor issued the data read request.

In Example 19, the subject matter of Example 16 can optionally include features wherein the type of the trigger event includes a predetermined number of hard bit read trigger events, and wherein the system further includes, having monitored the predetermined number of hard bit read trigger events, means for retiring an NVM storage location of a codeword for which a host processor issued one or more data read requests.

In Example 20, the subject matter of any one of Examples 16 and 19 can optionally include features wherein the type of the trigger event includes the predetermined number of hard bit read trigger events, and wherein the system further includes, having monitored the predetermined number of hard bit read trigger events, means for retiring a physical memory page that includes the NVM storage location of the codeword for which the host processor issued the data read requests.

Example 21 is a computer-readable storage medium that includes executable instructions for accessing data storable within a non-volatile memory (NVM) device in a computer system. The computer system includes at least one processor, and the computer-readable storage medium includes executable instructions to monitor a plurality of trigger events for detecting possible defects in at least one NVM device, in which each of the plurality of trigger events has an associated type. The computer-readable storage medium further includes executable instructions, having monitored at least one trigger event, to determine the type of the trigger event, and to apply at least one defect management policy to the NVM device based on the type of the trigger event.

Although illustrative examples of various embodiments of the disclosed subject matter are described herein, one of ordinary skill in the relevant art will appreciate that other manners of implementing the disclosed subject matter may alternatively be used. In the preceding description, various aspects of the disclosed subject matter have been described. For purposes of explanation, specific systems, apparatus, methods, and configurations were set forth in order to provide a thorough understanding of the disclosed subject matter. However, it will be apparent to one skilled in the relevant art having the benefit of this disclosure that the subject matter may be practiced without the specific details described herein. In other instances, well-known features, components, and/or modules were omitted, simplified, or combined in order not to obscure the disclosed subject matter.

It is noted that the term "operative to", as employed herein, means that a corresponding device, system, apparatus, etc., is able to operate, or is adapted to operate, for its desired functionality when the device, system, or apparatus is in its powered-on state. Moreover, various embodiments of the disclosed subject matter may be implemented in hardware, firmware, software, or some combination thereof, and may be described by reference to, or in conjunction with, program code such as instructions, functions, procedures, data structures, logic, application programs, design representations, and/or formats for simulation, emulation, and/or fabrication of a design, which when accessed by a machine results in the machine performing tasks, defining abstract data types or low-level hardware contexts, or producing a result.

It is further noted that the techniques illustrated in the drawing figures can be implemented using code and/or data stored and/or executed on one or more computing devices, such as general-purpose computers or computing devices. Such computers or computing devices store and communicate code and/or data (internally and/or with other computing devices over a network) using machine-readable media such as machine readable storage media (e.g., magnetic disks, optical disks, random access memory (RAM), read only memory (ROM), flash memory devices, phase-change memory) and machine readable communication media (e.g., electrical, optical, acoustical, or other form of propagated signals such as carrier waves, infrared signals, digital signals, etc.).

No element, operation, or instruction employed herein should be construed as critical or essential to the application unless explicitly described as such. Also, as employed herein, the article "a" is intended to include one or more items. Where only one item is intended, the term "one" or similar language is employed. Further, the phrase "based on" is intended to mean "based, at least in part, on" unless explicitly stated otherwise.

It is intended that the invention not be limited to the particular embodiments disclosed herein, but that the invention will include any and all particular embodiments and equivalents falling within the scope of the following appended claims.

What is claimed is:

1. A method of managing defects in a nonvolatile storage system, the nonvolatile storage system including one or more nonvolatile memory (NVM) devices, the method comprising:
monitoring, by an NVM defect management policy engine, a plurality of trigger events for detecting one or more possible defects in an NVM device among the one or more NVM devices, the respective trigger events having corresponding types, the NVM device including a plurality of physical memory pages, each physical memory page including a plurality of NVM storage locations;
having monitored a first trigger event among the plurality of trigger events for detecting a possible defect among the one or more possible defects in the NVM device, determining, by the NVM defect management policy engine, a trigger event type among the corresponding types of the respective trigger events that corresponds to the first trigger event, the first trigger event corresponding to a first NVM storage location among the plurality of NVM storage locations included in a respective one of the plurality of physical memory pages of the NVM device;
determining, by the NVM defect management policy engine, a likelihood of monitoring a second trigger event among the plurality of trigger events that (1) has a same trigger event type as the first trigger event, and (2) corresponds to a second NVM storage location among the plurality of NVM storage locations included in the respective one of the plurality of physical memory pages of the NVM device; and
having determined the likelihood of monitoring the second trigger event, proactively retiring, by the NVM defect management policy engine, the respective one of the plurality of physical memory pages of the NVM device based on the trigger event type of the first trigger event.

2. The method of claim 1 wherein the NVM device includes one or more blocks of nonvolatile memory, wherein the plurality of physical memory pages are included in a respective one of the one or more blocks of nonvolatile memory, and wherein the proactively retiring of the the respective one of the plurality of physical memory pages includes proactively retiring the respective one of the one or more blocks of nonvolatile memory.

3. A method of managing defects in a nonvolatile storage system, the nonvolatile storage system including one or more nonvolatile memory (NVM) devices, the method comprising:
monitoring, by and NVM defect management policy engine, a plurality of trigger events for detecting one or more possible defects in an NVM device among the one or more NVM devices, the respective trigger events having associated types;
having monitored a trigger event among the plurality of trigger events for detecting a possible defect among the one or more possible defects in the NVM device, determining, by the NVM defect management policy engine, a type among the associated types of the respective trigger events that corresponds to the monitored trigger event; and
applying, by the NVM defect management policy engine, at least one defect management policy to the NVM device based on the type of the monitored trigger event,
wherein the plurality of trigger events include a soft bit read trigger event and an exclusive-or (XOR) data recovery trigger event,
wherein the type of the monitored trigger event include one of a soft bit read trigger event type corresponding to the soft bit read trigger event and an XOR data recovery trigger event type corresponding to the XOR data recovery trigger event, and wherein the applying of the at least one defect management policy to the NVM device includes retiring an NVM storage location of a codeword for which a host processor issued a data read request.

4. The method of claim 3 wherein the applying of the at least one defect management policy to the NVM device includes retiring a physical memory page that includes the NVM storage location of the codeword for which the host processor issued the data read request.

5. A method of managing defects in a nonvolatile storage system, the nonvolatile storage system including one or more nonvolatile memory (NVM) devices, the method comprising:
- monitoring, by and NVM defect management policy engine, a plurality of trigger events for detecting one or more possible defects in an NVM device among the one or more NVM devices, the respective trigger events having associated types;
- having monitored a trigger event among the plurality of trigger events for detecting a possible defect among the one or more possible defects in the NVM device, determining, by the NVM defect management policy engine, a type among the associated types of the respective trigger events that corresponds to the monitored trigger event; and
- applying, by the NVM defect management policy engine, at least one defect management policy to the NVM device based on the type of the monitored trigger event,
- wherein the plurality of trigger events include a predetermined number of hard bit read trigger events,
- wherein the type of the monitored trigger event includes a hard bit read trigger event type corresponding to the predetermined number of hard bit read trigger events, and
- wherein the applying of the at least one defect management policy to the NVM device includes retiring an NVM storage location of a codeword for which a host processor issued one or more data read requests.

6. The method of claim 5 wherein the applying of the at least one defect management policy to the NVM device includes retiring a physical memory page that includes the NVM storage location of the codeword for which the host processor issued the data read requests.

7. The method of claim 6 further comprising:
programming a predetermined random pattern of data onto the physical memory page.

8. The method of claim 6 wherein the retiring of the physical memory page includes retiring a group of pages.

9. The method of claim 6 wherein the retiring of the physical memory page includes retiring a same page in a plurality of blocks in at least one of the one or more NVM devices.

10. A nonvolatile storage system, comprising:
an nonvolatile memory (NVM) controller;
one or more NVM devices communicably coupled to the NVM controller; and
an NVM defect management policy engine communicably coupled to the NVM controller, wherein the NVM defect management policy engine is operative:
to monitor a plurality of trigger events for detecting one or more possible defects in an NVM device among the one or more NVM devices, the respective trigger events having corresponding types, the NVM device including a plurality of physical memory pages, each physical memory page including a plurality of NVM storage locations;
having monitored a first trigger event among the plurality of trigger events for detecting a possible defect among the one or more possible defects in the NVM device, to determine a trigger event type among the corresponding types of the respective trigger events that corresponds to the first trigger event, the first trigger event corresponding to a first NVM storage location among the plurality of NVM storage locations included in a respective one of the plurality of physical memory pages of the NVM device;
to determine a likelihood of monitoring a second trigger event among the plurality of trigger events that (1) has a same trigger event type as the first trigger event, and (2) corresponds to a second NVM storage location among the plurality of NVM storage locations included in the respective one of the plurality of physical memory pages of the NVM device; and
having determined the likelihood of monitoring the second trigger event, to proactively retire the respective one of the plurality of physical memory pages of the NVM device based one the trigger event type of the first trigger event.

11. A computer system, comprising:
a system bus;
a memory bus;
a display communicably coupled to the system bus;
at least one volatile memory coupled to the system bus; and
the nonvolatile storage system of claim 10 communicably coupled to the memory bus.

12. A nonvolatile storage system, comprising:
a nonvolatile memory (NVM) controller;
one or more NVM devices communicably coupled to the NVM controller; and
an NVM defect management policy engine communicably coupled to the NVM controller, wherein the NVM defect management policy engine is operative:
to monitor a plurality of trigger events for detecting one or more possible defects in an NVM device among the one or more NVM devices, the respective trigger events having associated types;
having monitored a trigger event among the plurality of trigger events for detecting a possible defect among the one or more possible defects in the NVM device, to determine a type among the associated types of the respective trigger events that corresponding to the monitored trigger event; and
to apply at least one defect management policy to the NVM device based on the type of the monitored trigger event,
wherein the plurality of trigger events include a soft bit read trigger event and an exclusive-or (XOR) data recovery trigger event,
wherein the type of the monitored trigger event includes one of a soft bit read trigger event type corresponding to the soft bit read trigger event and an XOR data recovery trigger event type corresponding to the XOR data recovery trigger event, and
wherein the NVM defect management policy engine is further operative, having monitored the soft bit read trigger event or the XOR data recovery trigger event, to retire an NVM storage location of a codeword for which a host processor issued a data read request.

13. The system of claim 12 wherein the NVM defect management policy engine is further operative, having monitored the so ft bit read trigger event or the XOR data recovery trigger event, to retire a physical memory page that includes the NVM storage location of the codeword for which the host processor issued the data read request.

14. A nonvolatile storage system, comprising:
a nonvolatile memory (NVM) controller;
one or more NVM devices communicably coupled to the NVM controller; and
an NVM defect management policy engine communicably coupled to the NVM controller, wherein the NVM defect management policy engine is operative:
to monitor a plurality of trigger events for detecting one or more possible defects in an NVM device among the one or more NVM devices, the respective trigger events having associated types;
having monitored a trigger event among the plurality of trigger events for detecting a possible defect among the one or more possible defects in the NVM device, to determine a type among the associated types of the respective trigger events that corresponding to the monitored trigger event; and
to apply at least one defect management policy to the NVM device based on the type of the monitored trigger event,
wherein the plurality of trigger events include a predetermined number of hard bit read trigger events,
wherein the type of the monitored trigger event includes a hard bit read trigger event type corresponding to the predetermined number of hard bit read trigger events, and
wherein the NVM defect management policy engine is further operative, having monitored the predetermined number of hard bit read trigger events, to retire an NVM storage location of a codeword for which a host processor issued one or more data read requests.

15. The system of claim 14 wherein the NVM defect management policy engine is further operative, having monitored the predetermined number of hard bit read trigger events, to retire a physical memory page that includes the NVM storage location of the codeword for which the host processor issued the data read requests.

16. The system of claim 15 wherein the NVM controller is operative to control programming of a predetermined random pattern of data onto the physical memory page.

17. A nonvolatile storage system including one or more nonvolatile memory (NVM) devices, the system comprising:
means for monitoring a plurality of trigger events for detecting one or more possible defects in an NVM device among the one or more NVM devices, the respective trigger events having corresponding types, the NVM device including a plurality of physical memory pages, each physical memory page including a plurality of NVM storage locations;
having monitored a first trigger event among the plurality of trigger events for detecting a possible defect among the one or more possible defects in the NVM device, means for determining a trigger event type among the corresponding types of the respective trigger events that corresponds to the first trigger event, the first trigger event corresponding to a first NVM storage location among the plurality of NVM storage locations included in a respective one of the plurality of physical memory pages of the NVM device;
means for determining a likelihood of monitoring a second trigger event among the plurality of trigger events that (1) has a same trigger event type as the first trigger event, and (2) corresponds to a second NVM storage location among the plurality of NVM storage locations included in the respective one of the plurality of physical memory pages of the NVM device; and
having determined the likelihood of monitoring the second trigger event, means for proactively retiring the respective one of the plurality of physical memory pages of the NVM device based on the trigger event type of the first trigger event.

18. The nonvolatile storage system of claim 17 wherein the NVM device includes one or more blocks of nonvolatile memory, wherein the plurality of physical memory pages are included in a respective one of the one or more blocks of nonvolatile memory, and wherein the means for proactively retiring the respective one of the plurality of physical memory pages includes means for proactively retiring the respective one of the one or more blocks of nonvolatile memory.

19. A non-transitory computer-readable storage medium including executable instructions for accessing data storable within a non-volatile memory (NVM) device in a computer system, the computer system including at least one processor, the non-transitory computer-readable storage medium comprising executable instructions:
to monitor a plurality of trigger events for detecting one or more possible defects in the NVM device, the respective trigger events having associated types;
having monitored a trigger event among the plurality of trigger events for detecting a possible defect among the one or more possible defects in the NVM device, to determine a type among the associated types of the respective trigger events that corresponds to the monitored trigger event; and
to apply at least one defect management policy to the NVM device based on the type of the monitored trigger event,
wherein the plurality of trigger events include a soft bit read trigger event and an exclusive-or (XOR) data recovery trigger event,
wherein the type of the monitored trigger event includes one of a soft bit read trigger event type corresponding to the soft bit read trigger event and an XOR data recovery trigger event type corresponding to the XOR data recovery trigger event, and
wherein the non-transitory computer-readable storage medium further comprises executable instructions, having monitored the soft bit read trigger event or the XOR data recovery trigger event, to retire an NVM storage location of a codeword for which a host processor issued a data read request.

20. The non-transitory computer-readable storage medium of claim 19 further comprising executable instructions, having monitored the soft bit read trigger event or the XOR data recovery trigger event, to retire a physical memory page that includes the NVM storage location of the codeword for which the host processor issued the data read request.

* * * * *